(12) United States Patent
Hood

(10) Patent No.: US 11,036,797 B2
(45) Date of Patent: Jun. 15, 2021

(54) EFFICIENT STORAGE AND UTILIZATION OF A HIERARCHICAL DATA SET

(71) Applicant: ADTRAN, Inc., Huntsville, AL (US)

(72) Inventor: Jonathan Hood, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 105 days.

(21) Appl. No.: 16/123,124

(22) Filed: Sep. 6, 2018

(65) Prior Publication Data

US 2019/0114368 A1    Apr. 18, 2019

Related U.S. Application Data

(60) Provisional application No. 62/571,535, filed on Oct. 12, 2017.

(51) Int. Cl.
| | |
|---|---|
| *G06F 16/00* | (2019.01) |
| *G06F 16/835* | (2019.01) |
| *G06F 16/901* | (2019.01) |
| *G06F 9/54* | (2006.01) |

(52) U.S. Cl.
CPC .......... *G06F 16/835* (2019.01); *G06F 9/54* (2013.01); *G06F 16/8373* (2019.01); *G06F 16/9024* (2019.01); *G06F 16/9027* (2019.01)

(58) Field of Classification Search
CPC .. G06F 16/338; G06F 16/835; G06F 16/8373; G06F 16/9024; G06F 16/9027
USPC ........................................................ 707/713
See application file for complete search history.

(56) References Cited

U.S. PATENT DOCUMENTS

| | | | | |
|---|---|---|---|---|
| 7,734,602 B2 * | 6/2010 | Folkert | ............... | G06F 16/2272 |
| | | | | 707/696 |
| 7,769,747 B2 * | 8/2010 | Berg | ..................... | G06F 9/4493 |
| | | | | 707/716 |
| 8,200,594 B1 * | 6/2012 | Bleiweiss | ............. | G06T 19/003 |
| | | | | 706/45 |
| 8,316,060 B1 * | 11/2012 | Snyder, II | ........... | G06F 16/9024 |
| | | | | 707/797 |
| 8,321,408 B1 | 11/2012 | Rawlins et al. | | |

(Continued)

OTHER PUBLICATIONS

Carmen et al., "Introduction To Algorithms", MIT Press, Jan. 2009, 586-623.

(Continued)

*Primary Examiner* — Ashish Thomas
*Assistant Examiner* — Rezwanul Mahmood
(74) *Attorney, Agent, or Firm* — Fish & Richardson P.C.

(57) ABSTRACT

First data of a hierarchical data structure is accessed. A directed graph is generated based on the first data. Generating the directed graph includes creating multiple nodes representing the first data and linking first nodes representing data at a particular level of the hierarchical data structure to second nodes representing data at a lower level of the hierarchical data structure. A query requesting information from the hierarchical data structure is received. A particular node, that is a starting point for searching the directed graph based on the query, is identified within the directed graph. Out-links, that link the particular node to other nodes of the directed graph, are identified. Each of the other nodes, that is connected to the particular node by the out-links, is inspected to determine which of the other nodes represents responsive data matching the query. The query is responded with the responsive data.

14 Claims, 5 Drawing Sheets

(56) References Cited

U.S. PATENT DOCUMENTS

| | | | |
|---|---|---|---|
| 8,515,983 B1* | 8/2013 | Snyder, II | G06F 16/9024 707/760 |
| 9,037,571 B1* | 5/2015 | Baranowski | G06F 16/9024 707/716 |
| 9,436,760 B1* | 9/2016 | Tacchi | G06N 5/022 |
| 9,558,265 B1* | 1/2017 | Tacchi | G06N 5/022 |
| 9,576,020 B1* | 2/2017 | Patterson | G06F 16/9024 |
| 9,836,183 B1* | 12/2017 | Love | G06F 16/9024 |
| 10,089,676 B1* | 10/2018 | Gupta | G06Q 30/0633 |
| 10,474,653 B2* | 11/2019 | Mukherjee | G06F 16/24552 |
| 10,867,693 B2* | 12/2020 | Kural | G16B 30/00 |
| 2003/0163494 A1* | 8/2003 | Bender | G06F 16/2343 |
| 2003/0225743 A1* | 12/2003 | Inokuchi | G06F 16/9024 |
| 2005/0071465 A1* | 3/2005 | Zeng | G06F 16/9535 709/224 |
| 2006/0059119 A1* | 3/2006 | Canright | G06F 16/951 |
| 2007/0208693 A1* | 9/2007 | Chang | G06F 16/9024 |
| 2007/0239691 A1* | 10/2007 | Ordonez | G06F 16/24544 |
| 2008/0084880 A1* | 4/2008 | Dharwadkar | H04L 45/7453 370/392 |
| 2008/0084881 A1* | 4/2008 | Dharwadkar | H04L 45/50 370/392 |
| 2008/0133187 A1* | 6/2008 | Smith | G06F 30/00 703/2 |
| 2008/0162547 A1* | 7/2008 | Bonev | G06F 11/3495 |
| 2008/0162552 A1* | 7/2008 | Bonev | G06F 8/75 |
| 2008/0243829 A1* | 10/2008 | Liu | G06F 16/35 |
| 2010/0161651 A1* | 6/2010 | Cras | G06F 16/24544 707/769 |
| 2010/0223266 A1* | 9/2010 | Balmin | G06F 16/285 707/748 |
| 2011/0113095 A1* | 5/2011 | Hatami-Hanza | H04L 67/10 709/204 |
| 2011/0173189 A1* | 7/2011 | Singh | G06F 16/9024 707/722 |
| 2012/0197908 A1* | 8/2012 | Unno | G06F 40/258 707/749 |
| 2013/0212060 A1* | 8/2013 | Crouse | G06F 16/93 707/602 |
| 2013/0226934 A1* | 8/2013 | Brautbar | G06Q 30/02 707/748 |
| 2014/0092901 A1* | 4/2014 | Kapadia | H04L 49/356 370/390 |
| 2014/0244657 A1* | 8/2014 | Mizell | G06F 16/9024 707/743 |
| 2015/0124826 A1* | 5/2015 | Edsall | H04L 45/66 370/392 |
| 2015/0154262 A1* | 6/2015 | Yang | G06F 16/273 707/649 |
| 2015/0169758 A1* | 6/2015 | Assom | G06F 16/36 707/603 |
| 2015/0269280 A1* | 9/2015 | Astier | G06F 16/9024 707/798 |
| 2015/0278396 A1* | 10/2015 | Vasilyeva | G06F 16/3331 707/769 |
| 2016/0055191 A1* | 2/2016 | Joshi | G06F 16/24534 707/744 |
| 2016/0063037 A1* | 3/2016 | Savkli | G06F 16/9024 707/722 |
| 2016/0063590 A1* | 3/2016 | Subramanya | G06F 16/9024 705/26.61 |
| 2016/0179883 A1* | 6/2016 | Chen | G06F 16/24544 707/714 |
| 2016/0179887 A1* | 6/2016 | Lisonbee | G06F 16/9024 707/718 |
| 2016/0306897 A1* | 10/2016 | Huang | G06F 16/9024 |
| 2016/0342709 A1* | 11/2016 | Fokoue-Nkoutche | G06F 16/9024 |
| 2017/0109383 A1* | 4/2017 | Semenyuk | G06F 16/24568 |
| 2017/0195188 A1* | 7/2017 | Bennett | H04L 41/22 |
| 2017/0212914 A1 | 7/2017 | Schrock et al. | |
| 2017/0221240 A1* | 8/2017 | Stetson | G06F 16/904 |
| 2017/0300552 A1* | 10/2017 | Mandadi | G06F 16/1873 |
| 2017/0364534 A1* | 12/2017 | Zhang | G06N 5/04 |
| 2017/0364698 A1* | 12/2017 | Goldfarb | G06F 16/9024 |
| 2017/0366353 A1* | 12/2017 | Struttmann | G06F 21/64 |
| 2018/0039673 A1* | 2/2018 | Chen | G06F 16/9024 |
| 2018/0062940 A1* | 3/2018 | Pignataro | H04L 41/26 |
| 2018/0139129 A1* | 5/2018 | Dowlatkhah | G06F 21/45 |
| 2018/0181615 A1* | 6/2018 | Asher | G06F 16/2453 |
| 2018/0288098 A1* | 10/2018 | Wang | G06F 16/9024 |
| 2019/0114368 A1* | 4/2019 | Hood | G06F 16/835 |
| 2019/0245836 A1* | 8/2019 | Erickson | H04W 4/029 |

OTHER PUBLICATIONS

EP Office Action in European Application No. 18200188.3, dated Mar. 10, 2020, 8 pages.

EP Supplementary Search Report in European Application No. 18200188.3, dated Feb. 14, 2019, 10 pages.

Nataf et al., "jYang: A YANG parser in java N° ????", INRIA, Aug. 27, 2009, 32 pages.

* cited by examiner

|            | Sports Soccer | Team 1 | Team 2 | Player A | Player B | Player C | Player D |
|------------|---------------|--------|--------|----------|----------|----------|----------|
| Sports Soccer | 0 | 1 | 1 | 1 | 1 | 1 | 1 |
| Team 1     | 1 | 0 | 0 | 1 | 1 | 0 | 0 |
| Team 2     | 1 | 0 | 0 | 0 | 0 | 1 | 1 |
| Player A   | 1 | 1 | 0 | 0 | 0 | 0 | 0 |
| Player B   | 1 | 1 | 0 | 0 | 0 | 0 | 0 |
| Player C   | 1 | 0 | 1 | 0 | 0 | 0 | 0 |
| Player D   | 1 | 0 | 1 | 0 | 0 | 0 | 0 |

|          | Team 2 | Player C | Player D |
|----------|--------|----------|----------|
| Team 2   | 0 | 1 | 1 |
| Player C | 1 | 0 | 0 |
| Player D | 1 | 0 | 0 |

|  | Sports Soccer | Team 1 | Team 2 | Player A | Player B | Player C | Player D |
|---|---|---|---|---|---|---|---|
| Sports Soccer | 0 | 1 | 1 | 1 | 1 | 1 | 1 |
| Team 1 | 0 | 0 | 0 | 1 | 1 | 0 | 0 |
| Team 2 | 0 | 0 | 0 | 0 | 0 | 1 | 1 |
| Player A | 0 | 0 | 0 | 0 | 0 | 0 | 0 |
| Player B | 0 | 0 | 0 | 0 | 0 | 0 | 0 |
| Player C | 0 | 0 | 0 | 0 | 0 | 0 | 0 |
| Player D | 0 | 0 | 0 | 0 | 0 | 0 | 0 |

|  | Team 2 | Player C | Player D |
|---|---|---|---|
| Team 2 | 0 | 1 | 1 |
| Player C | 0 | 0 | 0 |
| Player D | 0 | 0 | 0 |

EFFICIENT STORAGE AND UTILIZATION OF A HIERARCHICAL DATA SET

CLAIM OF PRIORITY

This application claims priority to U.S. Patent Application No. 62/571,535 filed on Oct. 12, 2017, the entire contents of which are hereby incorporated by reference.

BACKGROUND

This specification relates to efficiently representing and utilizing hierarchical data sets.

Network configuration data spans an entire network that includes many network devices. In general, network configuration data is modeled as a tree data structure (e.g., a YANG data model) and is often queried for network device information.

SUMMARY

In general, one innovative aspect of the subject matter described in this specification can be embodied in methods for storing, retrieving, and filtering network configuration data. One example computer-implemented method includes accessing first data of a hierarchical data structure, generating a directed graph based on the first data, including creating a plurality of nodes representing the first data and linking first nodes representing data at a particular level of the hierarchical data structure to second nodes representing data at a lower level of the hierarchical data structure, receiving a query requesting information from the hierarchical data structure, identifying, within the directed graph, a particular node that is a starting point for searching the directed graph based on the query, identifying out-links that link the particular node to other nodes of the directed graph, inspecting each of the other nodes that is connected to the particular node by the out-links to determine which of the other nodes represents responsive data matching the query, and responding to the query with the responsive data matching the query based on the inspecting.

Particular embodiments of the subject matter described in this specification can be implemented so as to realize one or more of the following advantages. For example, the methods, devices, and/or systems described in the present disclosure can store YANG modeled data (e.g., network configuration data modeled as a hierarchical tree structure) as a directed graph. The directed graph can be represented and stored, for example, as an adjacency table (also known as adjacency matrix) on disk. In doing so, data modeled in a network specific modeling language (e.g., YANG) can be mapped to and stored in a tabular database (e.g., an adjacency table). Querying YANG modeled data can then be performed efficiently on a tabular database. In addition, to accelerate a query process, only a portion of a tabular database, that is required for the query, is loaded in memory to process the query. In doing so, processing a query in memory is less restricted by the capacity of the memory since the complete tabular database is not loaded in memory. Additionally, the portion of the tabular database can be maintained in memory once loaded, so that multiple queries, which often utilize the same dataset, can be processed on the already loaded portion of the tabular database set rather than needing to again reload the already loaded portion of the tabular database. Thus, maintaining the loaded portion of the tabular database in memory reduces the processing needed to be performed at query time, thereby leading to faster processing of the queries.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
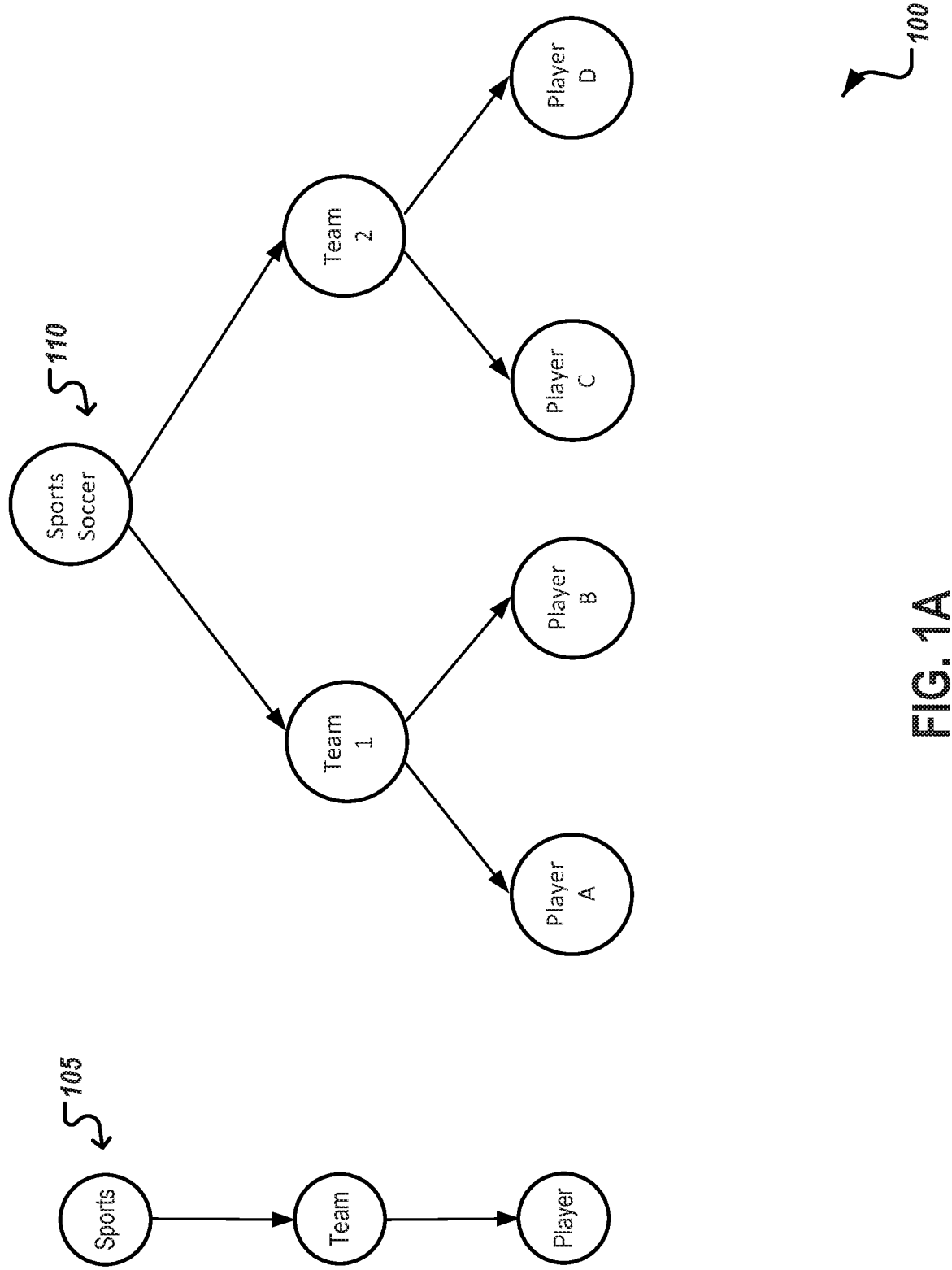
FIG. 1A is a diagram illustrating an example tree data structure with hierarchically modeled data.

This document describes methods, systems, and apparatus for storing, retrieving, and filtering hierarchically modeled network configuration data within a directed graph. For example, YANG modeled network configuration data, in general, is tree structured data and can be viewed as a directed graph. The directed graph can be represented and stored, for example, as an adjacency table on disk. Querying YANG modeled network configuration data can then be performed on the adjacency table. Although this disclosure refers to YANG modeled network configuration data, for purposes of example, the subject matter of this document can be applied to other types of tree structured data.

YANG modeled network configuration data can be stored as an in-memory tree. However, the amount of data that can be stored as an in-memory tree may be limited by the capacity of the memory. The following disclosure describes several techniques for storing, retrieving, and filtering YANG modeled network configuration data. In some implementations, YANG modeled network configuration data can be viewed as a directed graph, and stored on disk as an adjacency table. An application program interface (API) is provided for a user to write network configuration data in the YANG data modeling language. The written YANG modeled network configuration data is then stored as an adjacency table on disk. In addition, the user can query, via the API, the YANG modeled network configuration data. Querying the YANG modeled network configuration data can be processed on the adjacency table stored on disk. For example, based on a query definition, a starting point (i.e., a vertex) in a directed graph of the YANG modeled network configuration data can be identified. The directed graph can be traversed, from the starting point, to filter out any vertex (also referred to as nodes), connected to the starting points by an out-link of the starting point, that doesn't match the query. In some implementations, if a particular vertex does match the query, the child vertices of the particular vertex can be inspected next, to filter out any child vertex that doesn't match the query. The matching vertices can be serialized, and provided, via the API, to the user.

In some implementations, a query can be processed in memory to accelerate a query process. Instead of loading in memory a complete adjacency table representing a complete directed graph, only a portion of the complete adjacency table, representing a subgraph of the complete directed graph that is required for the query, is loaded in memory. For example, after identifying a starting point in a directed graph of YANG modeled network configuration data based on a query definition, a subgraph of the directed graph that starts from the starting point can be identified. A portion of an adjacency table that represents the subgraph can be loaded in memory to process the query. For a subsequent query, if a starting point identified for the subsequent query is included in the portion of the adjacency table that is already loaded in memory, the subsequent query can be processed in memory, without reloading the portion of the adjacency table. The description provided in this document refers generally to directed graphs, which should be understood to encompass any type of directed graph (e.g., cyclic graphs, acyclic graphs (including trees), and other appropriate graphs). As such, the description that follows is applicable to any appropriate directed graph.

FIG. 1A is a diagram 100 illustrating an example tree data structure with hierarchically modeled data. As illustrated in FIG. 1A, the diagram 100 includes an example YANG data model 105 and example tree structured data 110 populated with YANG modeled data.

Figure 1B:
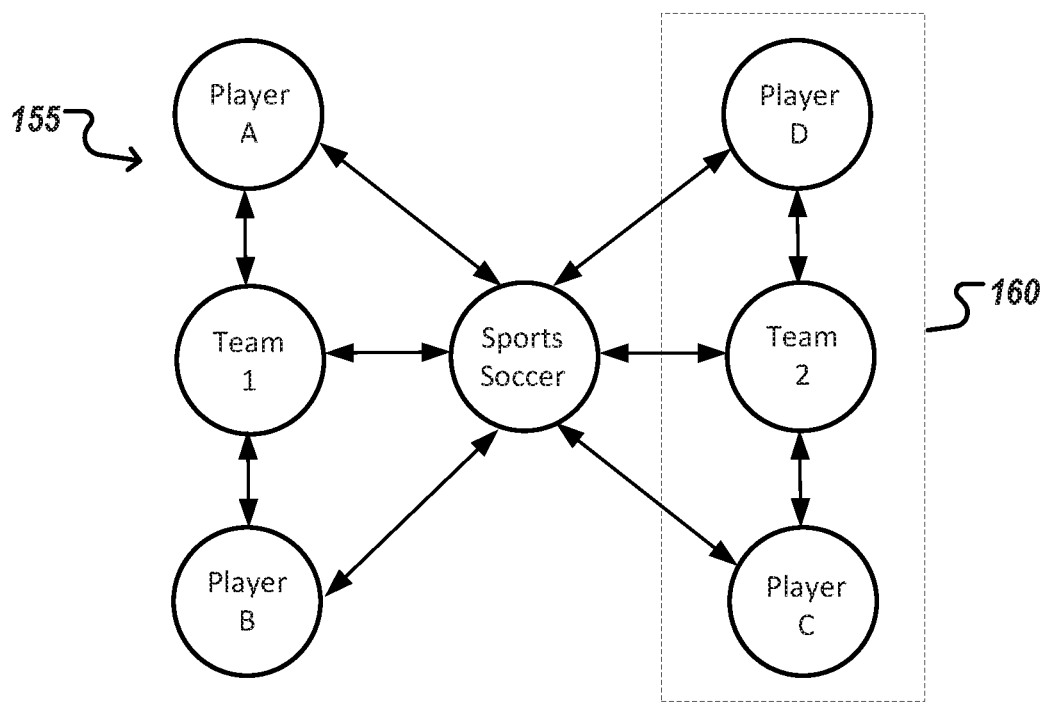
FIG. 1B is a diagram illustrating an example directed graph and example adjacency tables storing hierarchically modeled data.

FIG. 1B is a diagram 150 illustrating an example directed graph and example adjacency tables storing hierarchically modeled data. As illustrated in FIG. 1B, the diagram 150 includes an example directed graph 155 and an example adjacency table 165. In some implementations, the example tree structured data 110 in FIG. 1A can be viewed as the example directed graph 155, and YANG modeled data of the example tree structured data 110 can be stored as the example directed graph 155. For example, YANG modeled data of the example tree structured data 110 (i.e., "Sports Soccer," "Team 1," "Team 2,", "Player A," "Player B," "Player C," and "Player D") are stored in seven vertices of the example directed graph 155. The data hierarchies of the example tree structured data 110 are represented by links (also referred to as edges) connecting the seven vertices in the example directed graph 155.

In some implementations, the example directed graph 155 can be represented or stored as the example adjacency table 165. The elements of the example adjacency table 165 indicate whether pairs of vertices are adjacent or not in the example directed graph 155. For example, if a pair of vertices (e.g., "Sports Soccer" and "Team 1") is adjacent in the example directed graph 155, a value of 1 is stored in the example adjacency table 165 for the pair of vertices. If a pair of vertices (e.g., "Team 1" and "Team 2") is not adjacent in the example directed graph 155, a value of 0 is stored in the example adjacency table 165 for the pair of vertices. The example adjacency table 165 can be stored on disk. In some implementations, querying the example tree structured data 110 can be performed on the example adjacency table 165 stored on disk.

In some implementations, querying the example tree structured data 110 can be performed in memory, to accelerate a query process. For purposes of example, assume that a query for player name with jersey number 7 in "Team 2" is received. Based on the query definition, vertex "Team 2" is determined to be a starting point in the example directed graph 155 for the query. A subgraph 160 that starts from the vertex "Team 2" is determined from the example directed graph 155. An adjacency table 170, that is a portion of the example adjacency table 165, is created. The adjacency table 170 represents the subgraph 160. To process the query in memory, the adjacency table 170, instead of the adjacency table 165, is loaded in memory.

Figure 1C:
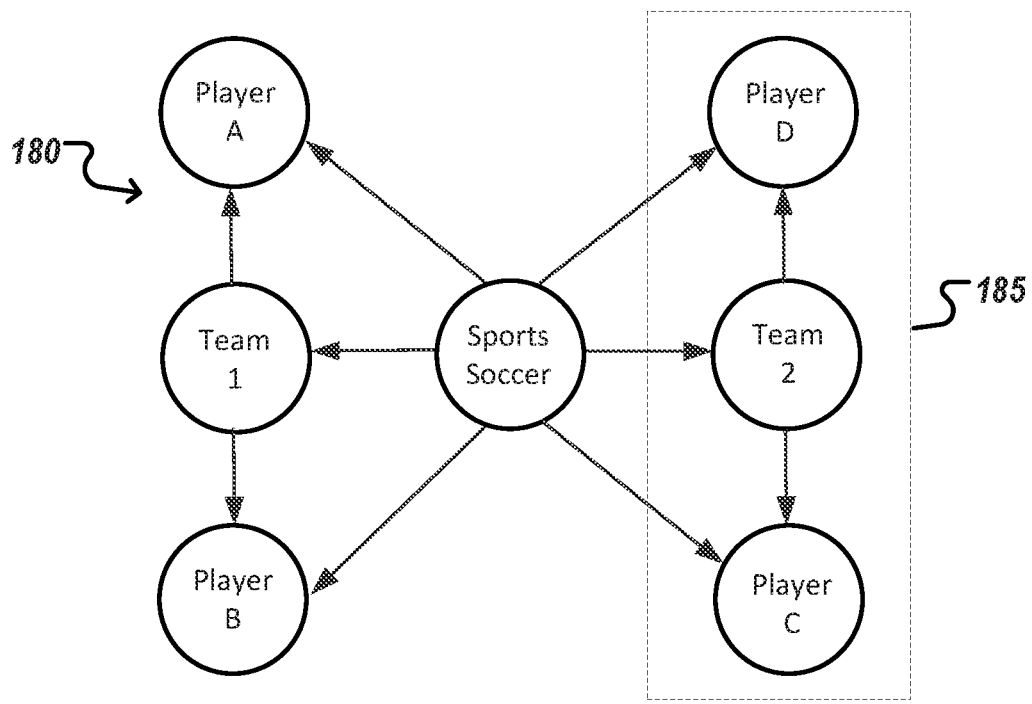
FIG. 1C is a diagram illustrating another example directed graph and example adjacency tables storing hierarchically modeled data.

FIG. 1C is a diagram 175 illustrating another example directed graph and example adjacency tables storing hierarchically modeled data. As illustrated in FIG. 1C, the diagram 175 includes an example directed graph 180 and an example adjacency table 190. In some implementations, the example tree structured data 110 in FIG. 1A can, alternatively, be viewed as the example directed graph 180, and YANG modeled data of the example tree structured data 110 can be stored as the example directed graph 180. For example, YANG modeled data of the example tree structured data 110 (i.e., "Sports Soccer," "Team 1," "Team 2,", "Player A," "Player B," "Player C," and "Player D") are stored in seven vertices of the example directed graph 180. The links connecting the seven vertices in the example directed graph 180 are only from first vertices representing data at a particular level of the example tree structured data 110 to second vertices representing data at a next lower level of the example tree structured data 110 (e.g., a directed link from "Sports Soccer" to "Team 1").

In some implementations, the example directed graph 180 can be represented or stored as the example adjacency table 190. The elements of the example adjacency table 190 indicate whether pairs of vertices are adjacent or not in the example directed graph 180. For example, if a pair of vertices (e.g., "Sports Soccer" and "Team 1") is adjacent in the example directed graph 180, a value of 1 is stored in the example adjacency table 190 for the pair of vertices. If a pair of vertices (e.g., "Team 1" and "Team 2") is not adjacent in the example directed graph 180, a value of 0 is stored in the example adjacency table 190 for the pair of vertices. The example adjacency table 190 can be stored on disk. In some implementations, querying the example tree structured data 110 can be performed on the example adjacency table 190 stored on disk.

In some implementations, querying the example tree structured data 110 can be performed in memory, to accelerate a query process. For purposes of example, assume that a query for player name with jersey number 7 in "Team 2" is received. Based on the query definition, vertex "Team 2" is determined to be a starting point in the example directed graph 180 for the query. A subgraph 185 that starts from the vertex "Team 2" is determined from the example directed graph 180. An adjacency table 195, that is a portion of the example adjacency table 190, is created. The adjacency table 195 represents the subgraph 185. To process the query in memory, the adjacency table 195, instead of the adjacency table 190, is loaded in memory.

Figure 2:
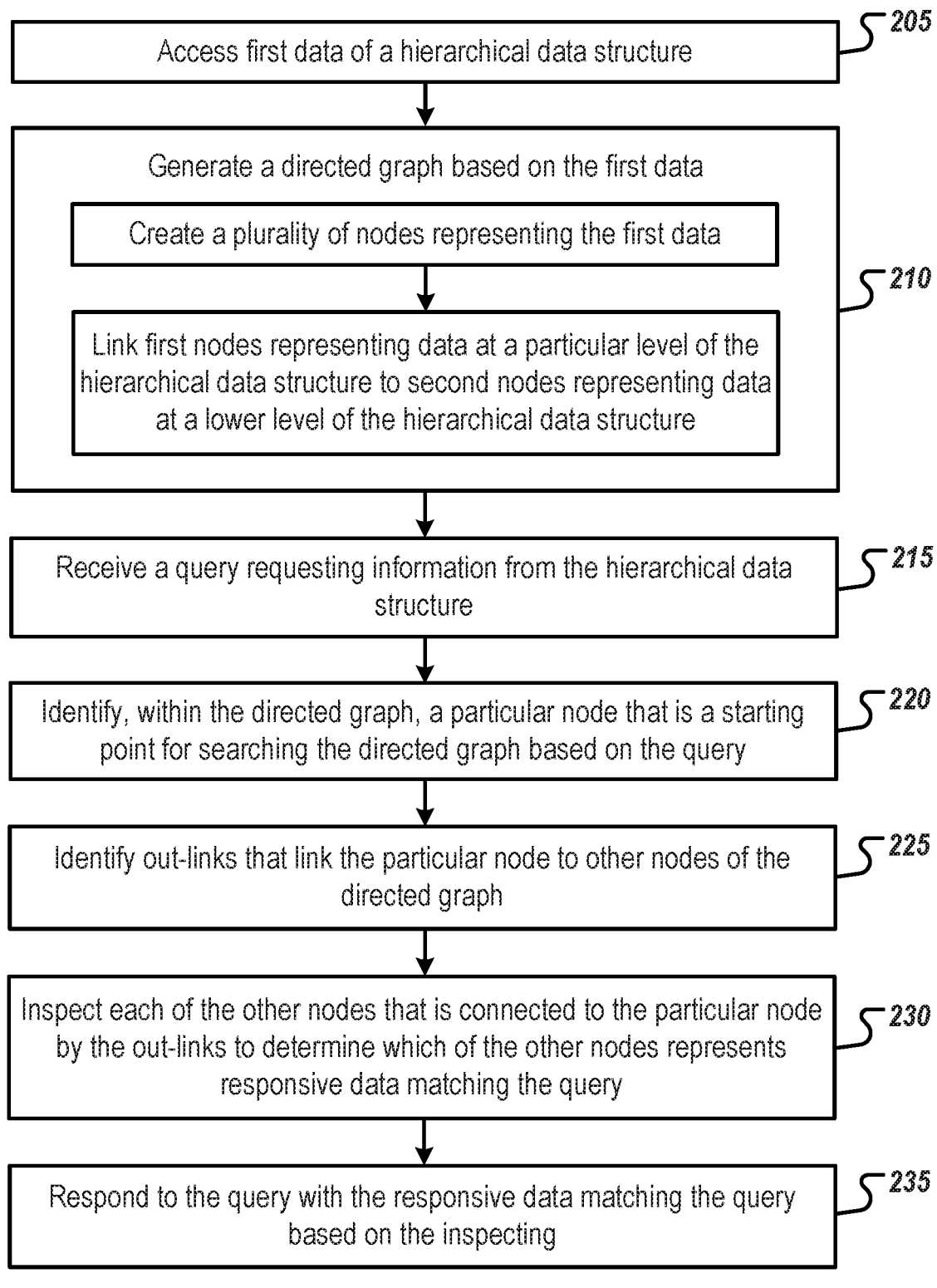
FIG. 2 is a flow chart of an example process for storing, retrieving, and filtering hierarchically modeled data.

FIG. 2 is a flow chart of an example process 200 for storing, retrieving, and filtering hierarchically modeled data. The example process 200 can be performed, for example, by one or more telecommunications devices, such as those described with reference to FIG. 3 (e.g., computer 302). The example process 200 can also be implemented as instructions stored on a non-transitory, computer-readable medium that, when executed by one or more telecommunications devices, configures the one or more telecommunications devices to perform and/or cause the one or more telecommunications devices to perform the actions of the example process 200.

First data of a hierarchical data structure is accessed (205). In some implementations, the first data is tree structured data. In some implementations, the first data is YANG modeled data. The first data can be, for example, network configuration data that specifies various characteristics of devices that are operating in a given telecommunications network. For example, the first data can specify configurations of devices operating in the network, current operational states of the devices operating in the network, and any other attributes of the devices of a telecommunications network. In some implementations, the first data is YANG modeled network configuration data, and an application program interface (API) is provided for a user to write network configuration data in the YANG data modeling language to be stored on disk. The written YANG modeled network configuration data is accessed via the API.

A directed graph is generated based on the first data (210). In some implementations, the directed graph is generated by first creating multiple nodes (i.e., vertices) representing the first data, and then linking first nodes representing data at a particular level of the hierarchical data structure to second nodes representing data at a lower level than the particular level of the hierarchical data structure. The created multiple nodes include both the first nodes and the second nodes. In some implementations, nodes in the directed graph represent or store corresponding data in the hierarchical data structure, and links in the directed graph represent data hierarchies in the hierarchical data structure. For example, a directed link links a node representing data at a particular level of the hierarchical data structure to another node representing data at a lower level than the particular level of the hierarchical data structure, as discussed above. The directed graph can be stored in the form of an adjacency table to facilitate efficient searching of the data.

A query requesting information from the hierarchical data structure is received (215). In some implementations, the query requests information from the YANG modeled network configuration data. For example, the query could be a request to identify all devices that are in a particular operational state. The query can be received via the API.

A particular node within the directed graph is identified based on the query (220). The particular node is a starting point for searching the directed graph. For purposes of example, assume that a query for player name with jersey number 7 in "Team 2" is received. Based on the query definition, the node "Team 2" could be identified as a starting point for searching the example directed graph 180 in FIG. 1C.

Out-links that link the particular node to other nodes of the directed graph are identified (225). In some implementations, the out-links are directed links from the particular node (e.g., node "Team 2" in FIG. 1C) to other nodes (e.g., node "Player C" and node "Player D" in FIG. 1C) of the directed graph.

Each of the other nodes that is connected to the particular node by the out-links is inspected to determine which of the other nodes represents responsive data matching the query (230). For example, both the node "Player C" and the node "Player D" in FIG. 1C are inspected to determine which player wears jersey number 7.

A response to the query that includes the responsive data matching the query based on the inspecting is returned (235). For example, if "Player C" wears jersey number 7, the query is responded with the name of "Player C" (e.g., C). In some implementations, the data matching the query based on the inspecting is serialized and provided as a response to the query via the API. In some implementations, the responsive data is configuration data corresponding to the data of the YANG modeled network configuration data requested by the query.

The example process 200 shown in FIG. 2 can be modified or reconfigured to include additional, fewer, or different actions (not shown in FIG. 2), which can be performed in the order shown or in a different order. For example, after 210, an adjacency table representing the directed graph is generated. The adjacency table can be stored on disk. In some implementations, actions 225 and 230 can be performed based on the adjacency table stored on disk. For example, out-links can be identified by inspecting elements of the adjacency table associated with the particular node (e.g., row elements of "Team 1" in the example adjacency table 190 in FIG. 1C).

In some implementations, only a portion of the adjacency table, that represents the particular node and the other nodes to which the particular node is linked by the out-links, is loaded in memory. For example, a sub-graph (e.g., the subgraph 185 in FIG. 1C) that matches the query using the adjacency table is generated. The portion of the adjacency table (e.g., the adjacency table 195 in FIG. 1C) is created from the adjacency table and represents the sub-graph (e.g., the subgraph 185 in FIG. 1C). The portion of the adjacency table (e.g., the adjacency table 195 in FIG. 1C), instead of the complete adjacency table (e.g., the adjacency table 190 in FIG. 1C), is loaded in memory for processing the query.

In some implementations, after responding to the query, the portion of the adjacency table that represents the particular node and the other nodes to which the particular node is linked by the out-links is maintained in memory. Maintaining the portion of the adjacency table in memory after responding to the query can optimize future query processes. For example, if a subsequent query is received after responding to the query, a determination can be made that a starting point for the subsequent query is included in the portion of the adjacency table that is maintained in memory. In response to the determination, the subsequent query is responded to using the portion of the adjacency table that is maintained in memory and without reloading, in memory, that portion of the adjacency table.

In some implementations, one or more of the actions shown in FIG. 2 can be repeated or iterated, for example, until a terminating condition is reached. For example, at 230, if a node among the other nodes does match the query, the child nodes of the node can be inspected next to filter out any child node that doesn't match the query. Action 230 can be repeated or iterated until all nodes rooted from the particular node are inspected. In some implementations, one or more of the individual actions shown in FIG. 2 can be executed as multiple separate actions, or one or more subsets of the actions shown in FIG. 2 can be combined and executed as a single action. In some implementations, one or more of the individual actions shown in FIG. 2 may also be omitted from the example process 200.

Figure 3:
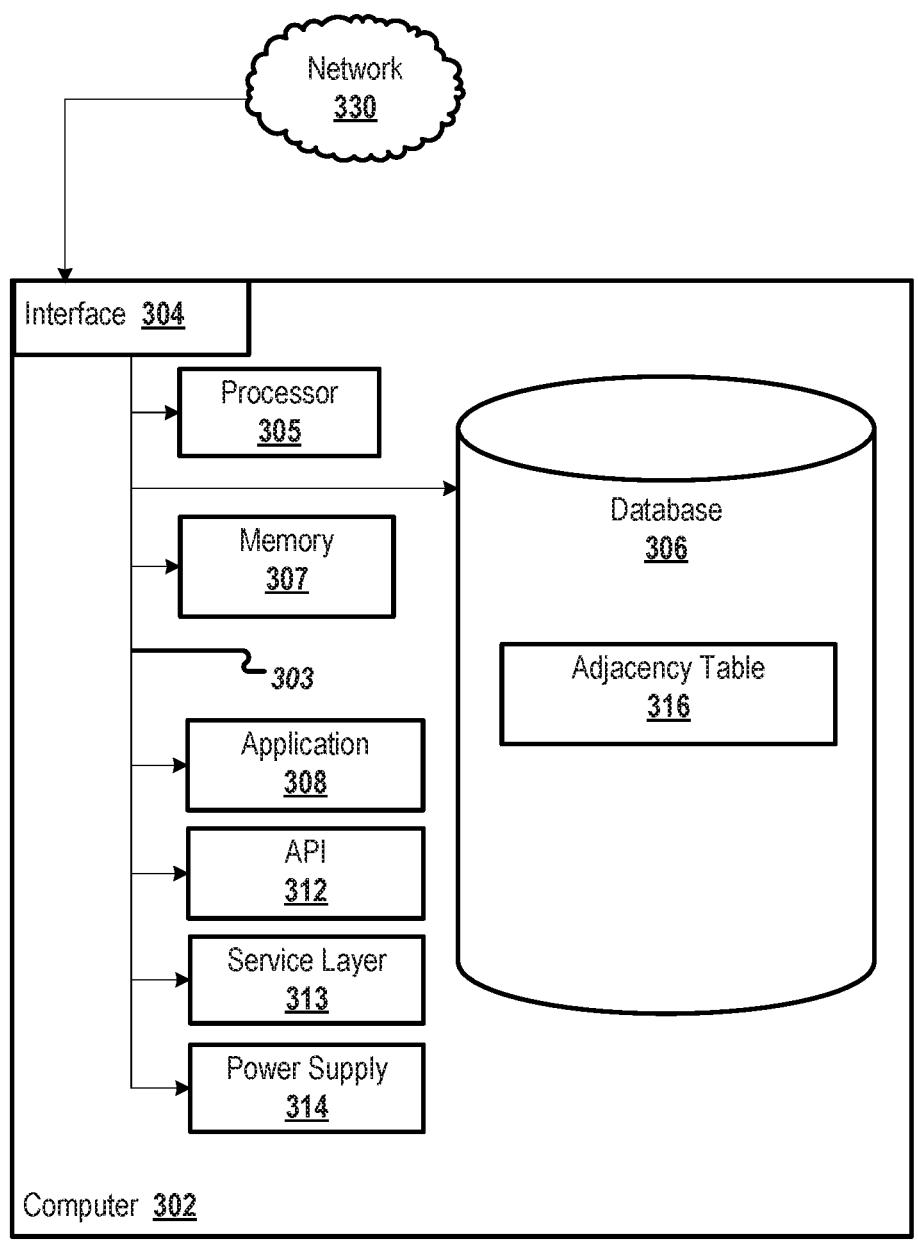
FIG. 3 is a block diagram illustrating an example of a computer system.

FIG. 3 is a block diagram illustrating an example of a computer system 300 used to provide computational functionalities associated with described algorithms, methods, functions, processes, flows, and procedures, according to an implementation of the present disclosure. The illustrated computer 302 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 302 can comprise a computer that includes an input device, such as a keypad, keyboard, touch screen, another input device, or a combination of input devices that can accept user information, and an output device that conveys information associated with the operation of the computer 302, including digital data, visual, audio, another type of information, or a combination of types of information, on a graphical-type user interface (UI) (or GUI) or other UI.

The computer 302 can serve in a role in a computer system as a client, network component, a server, a database or another persistency, another role, or a combination of roles for performing the subject matter described in the present disclosure. The illustrated computer 302 is communicably coupled with a network 330. In some implementations, one or more components of the computer 302 can be configured to operate within an environment, including cloud-computing-based, local, global, another environment, or a combination of environments.

At a high level, the computer 302 is an electronic computing device operable to receive, transmit, process, store, or manage data and information associated with the described subject matter. According to some implementations, the computer 302 can also include or be communicably coupled with a server, including an application server, e-mail server, web server, caching server, streaming data server, another server, or a combination of servers.

The computer 302 can receive requests over network 330 (for example, from a client software application executing on another computer 302) and respond to the received requests by processing the received requests using a software application or a combination of software applications. In addition, requests can also be sent to the computer 302 from internal users (for example, from a command console or by another internal access method), external or third-parties, or other entities, individuals, systems, or computers.

Each of the components of the computer 302 can communicate using a system bus 303. In some implementations, any or all of the components of the computer 302, including hardware, software, or a combination of hardware and software, can interface over the system bus 303 using an application programming interface (API) 312, a service layer 313, or a combination of the API 312 and service layer 313. The API 312 can include specifications for routines, data structures, and object classes. The API 312 can be either computer-language independent or dependent and refer to a complete interface, a single function, or even a set of APIs. The service layer 313 provides software services to the computer 302 or other components (whether illustrated or not) that are communicably coupled to the computer 302. The functionality of the computer 302 can be accessible for all service consumers using this service layer. Software services, such as those provided by the service layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 302, alternative implementations can illustrate the API 312 or the service layer 313 as stand-alone components in relation to other components of the computer 302 or other components (whether illustrated or not) that are communicably coupled to the computer 302. Moreover, any or all parts of the API 312 or the service layer 313 can be implemented as a child or a sub-module of another software module, enterprise application, or hardware module without departing from the scope of the present disclosure.

The computer 302 includes an interface 304. Although illustrated as a single interface 304 in FIG. 3, two or more interfaces 304 can be used according to particular needs, desires, or particular implementations of the computer 302. The interface 304 is used by the computer 302 for communicating with another computing system (whether illustrated or not) that is communicatively linked to the network 330 in a distributed environment. Generally, the interface 304 is operable to communicate with the network 330 and comprises logic encoded in software, hardware, or a combination of software and hardware. More specifically, the interface 304 can comprise software supporting one or more communication protocols associated with communications such that the network 330 or interface's hardware is operable to communicate physical signals within and outside of the illustrated computer 302.

The computer 302 includes a processor 305. Although illustrated as a single processor 305 in FIG. 3, two or more processors can be used according to particular needs, desires, or particular implementations of the computer 302. Generally, the processor 305 executes instructions and manipulates data to perform the operations of the computer 302 and any algorithms, methods, functions, processes, flows, and procedures as described in the present disclosure.

The computer 302 also includes a database 306 that can hold data for the computer 302, another component communicatively linked to the network 330 (whether illustrated or not), or a combination of the computer 302 and another component. For example, database 306 can be an in-memory, conventional, or another type of database storing data consistent with the present disclosure. In some implementations, database 306 can be a combination of two or more different database types (for example, a hybrid in-memory and conventional database) according to particular needs, desires, or particular implementations of the computer 302 and the described functionality. Although illustrated as a single database 306 in FIG. 3, two or more databases of similar or differing types can be used according to particular needs, desires, or particular implementations of the computer 302 and the described functionality. While database 306 is illustrated as an integral component of the computer 302, in alternative implementations, database 306 can be external to the computer 302. As illustrated, the database 306 holds the previously described adjacency table 316.

The computer 302 also includes a memory 307 that can hold data for the computer 302, another component or components communicatively linked to the network 330 (whether illustrated or not), or a combination of the computer 302 and another component. Memory 307 can store any data consistent with the present disclosure. In some implementations, memory 307 can be a combination of two or more different types of memory (for example, a combination of semiconductor and magnetic storage) according to particular needs, desires, or particular implementations of the computer 302 and the described functionality. Although illustrated as a single memory 307 in FIG. 3, two or more memories 307 or similar or differing types can be used according to particular needs, desires, or particular implementations of the computer 302 and the described functionality. While memory 307 is illustrated as an integral component of the computer 302, in alternative implementations, memory 307 can be external to the computer 302.

The application 308 is an algorithmic software engine providing functionality according to particular needs, desires, or particular implementations of the computer 302, particularly with respect to functionality described in the present disclosure. For example, application 308 can serve as one or more components, modules, or applications. Further, although illustrated as a single application 308, the application 308 can be implemented as multiple applications 308 on the computer 302. In addition, although illustrated as integral to the computer 302, in alternative implementations, the application 308 can be external to the computer 302.

The computer 302 can also include a power supply 314. The power supply 314 can include a rechargeable or non-rechargeable battery that can be configured to be either user- or non-user-replaceable. In some implementations, the power supply 314 can include power-conversion or management circuits (including recharging, standby, or another power management functionality). In some implementations, the power-supply 314 can include a power plug to allow the computer 302 to be plugged into a wall socket or another power source to, for example, power the computer 302 or recharge a rechargeable battery.

There can be any number of computers 302 associated with, or external to, a computer system containing computer 302, each computer 302 communicating over network 330. Further, the term "client," "user," or other appropriate terminology can be used interchangeably, as appropriate, without departing from the scope of the present disclosure. Moreover, the present disclosure contemplates that many users can use one computer 302, or that one user can use multiple computers 302.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
accessing first data of a hierarchical data structure;
generating a directed graph based on the first data, including:
creating a plurality of nodes representing the first data; and
linking first nodes representing data at a particular level of the hierarchical data structure to second nodes representing data at a lower level of the hierarchical data structure;
generating an adjacency table representing the directed graph;
receiving a query requesting information from the hierarchical data structure;
identifying, within the adjacency table representing the directed graph, a particular node that is a starting point for searching based on the query;
identifying, based on the adjacency table representing the directed graph, out-links that link the particular node to other nodes of the directed graph;
loading, in memory, only a portion of the adjacency table that represents the particular node and the other nodes to which the particular node is linked by the out-links;
processing the query using the portion of the adjacency table loaded in memory, including inspecting data from each of the other nodes that is connected to the particular node by the out-links to determine which of the other nodes represents responsive data matching the query;
generating, based on the inspecting and using the portion of the adjacency table loaded in memory, a sub-graph that matches the query;
serializing the sub-graph that matches the query and was generated using the portion of the adjacency table loaded in memory; and
responding to the query with the serialized sub-graph.

2. The method of claim 1, further comprising:
after responding to the query:
maintaining, in memory, the portion of the adjacency table that represents the particular node and the other nodes to which the particular node is linked by the out-links;
receiving a subsequent query;
determining that a starting point for the subsequent query is included in the portion of the adjacency table that is maintained in memory; and
responding to the subsequent query using the portion of the adjacency table that is maintained in memory and without reloading, in memory, that portion of the adjacency table.

3. The method of claim 1, wherein the first data is network configuration data.

4. The method of claim 3, wherein the network configuration data is YANG modeled data.

5. The method of claim 4, further comprising:
providing an application program interface (API) for a user to query the YANG modeled network configuration data of the directed graph.

6. The method of claim 5, wherein receiving a query comprises receiving, from the API, a query for data of the YANG modeled network configuration data; and
responding to the query comprises providing configuration data corresponding to the data of the YANG modeled network configuration data requested by the query.

7. A telecommunications device, comprising:
a memory; and
one or more processors coupled to the memory, wherein the one or more processors are configured to perform operations comprising:
accessing first data of a hierarchical data structure;
generating a directed graph based on the first data, including:

creating a plurality of nodes representing the first data; and linking first nodes representing data at a particular level of the hierarchical data structure to second nodes representing data at a lower level of the hierarchical data structure;

generating an adjacency table representing the directed graph;

receiving a query requesting information from the hierarchical data structure;

identifying, within the adjacency table representing the directed graph, a particular node that is a starting point for searching based on the query;

identifying, based on the adjacency table representing the directed graph, out-links that link the particular node to other nodes of the directed graph;

loading, in memory, only a portion of the adjacency table that represents the particular node and the other nodes to which the particular node is linked by the out-links;

processing the query using the portion of the adjacency table loaded in memory, including inspecting data from each of the other nodes that is connected to the particular node by the out-links to determine which of the other nodes represents responsive data matching the query;

generating, based on the inspecting and using the portion of the adjacency table loaded in memory, a sub-graph that matches the query;

serializing the sub-graph that matches the query and was generated using the portion of the adjacency table loaded in memory; and responding to the query with the serialized sub-graph.

8. The telecommunications device of claim 7, the operations further comprising:

after responding to the query:

maintaining, in memory, the portion of the adjacency table that represents the particular node and the other nodes to which the particular node is linked by the out-links;

receiving a subsequent query;

determining that a starting point for the subsequent query is included in the portion of the adjacency table that is maintained in memory; and responding to the subsequent query using the portion of the adjacency table that is maintained in memory and without reloading, in memory, that portion of the adjacency table.

9. The telecommunications device of claim 7, wherein the first data is network configuration data.

10. The telecommunications device of claim 9, wherein the network configuration data is YANG modeled data.

11. The telecommunications device of claim 10, the operations further comprising:

providing an application program interface (API) for a user to query the YANG modeled network configuration data of the directed graph.

12. The telecommunications device of claim 11, wherein receiving a query comprises receiving, from the API, a query for data of the YANG modeled network configuration data; and responding to the query comprises providing configuration data corresponding to the data of the YANG modeled network configuration data requested by the query.

13. A non-transitory, computer-readable medium storing one or more instructions executable by a computer system to perform operations comprising:

accessing first data of a hierarchical data structure;

generating a directed graph based on the first data, including:

creating a plurality of nodes representing the first data; and linking first nodes representing data at a particular level of the hierarchical data structure to second nodes representing data at a lower level of the hierarchical data structure;

generating an adjacency table representing the directed graph;

receiving a query requesting information from the hierarchical data structure;

identifying, within the adjacency table representing the directed graph, a particular node that is a starting point for searching based on the query;

identifying, based on the adjacency table representing the directed graph, out-links that link the particular node to other nodes of the directed graph;

loading, in memory, only a portion of the adjacency table that represents the particular node and the other nodes to which the particular node is linked by the out-links;

processing the query using the portion of the adjacency table loaded in memory, including inspecting data from each of the other nodes that is connected to the particular node by the out-links to determine which of the other nodes represents responsive data matching the query;

generating, based on the inspecting and using the portion of the adjacency table loaded in memory, a sub-graph that matches the query;

serializing the sub-graph that matches the query and was generated using the portion of the adjacency table loaded in memory; and responding to the query with the serialized sub-graph.

14. The non-transitory, computer-readable medium of claim 13, the operations further comprising:

after responding to the query:

maintaining, in memory, the portion of the adjacency table that represents the particular node and the other nodes to which the particular node is linked by the out-links;

receiving a subsequent query;

determining that a starting point for the subsequent query is included in the portion of the adjacency table that is maintained in memory; and responding to the subsequent query using the portion of the adjacency table that is maintained in memory and without reloading, in memory, that portion of the adjacency table.

* * * * *